United States Patent
Berggren et al.

(10) Patent No.: US 10,164,751 B2
(45) Date of Patent: Dec. 25, 2018

(54) METHODS AND NODES IN A WIRELESS COMMUNICATION SYSTEM

(71) Applicant: Huawei Technologies Co., Ltd., Shenzhen, Guangdong (CN)

(72) Inventors: Fredrik Berggren, Kista (SE); Brian Classon, Palatine, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 14/618,573

(22) Filed: Feb. 10, 2015

(65) Prior Publication Data
US 2015/0155993 A1 Jun. 4, 2015

Related U.S. Application Data

(63) Continuation of application No. PCT/EP2012/065756, filed on Aug. 10, 2012.

(51) Int. Cl.
*H04W 4/00* (2018.01)
*H04L 5/00* (2006.01)

(52) U.S. Cl.
CPC .......... *H04L 5/0051* (2013.01); *H04L 5/0007* (2013.01); *H04L 5/0023* (2013.01); *H04L 5/0048* (2013.01)

(58) Field of Classification Search
CPC ............. H04W 72/0446; H04W 88/08; H04W 72/0453
See application file for complete search history.

(56) References Cited

U.S. PATENT DOCUMENTS

| | | | |
|---|---|---|---|
| 2011/0044250 A1* | 2/2011 | Han | H04B 7/0689 370/328 |
| 2011/0103324 A1* | 5/2011 | Nam | H04L 5/0048 370/329 |
| 2011/0194536 A1* | 8/2011 | Kim | H04L 5/0023 370/335 |
| 2012/0039298 A1* | 2/2012 | Lee | H04L 1/0079 370/330 |
| 2012/0163335 A1* | 6/2012 | Chung | H04L 5/0023 370/330 |
| 2013/0114756 A1* | 5/2013 | Jia | H04J 11/00 375/295 |

(Continued)

OTHER PUBLICATIONS

61599948 Provisional Specification.*

(Continued)

*Primary Examiner* — Siren Wei

(57) ABSTRACT

Methods and nodes are provided for transmission of information, over at least one antenna port, in a subframe, which information is received by a receiver in a wireless communication system. Demodulation of the information entity by the receiver is enabled by also transmitting a Demodulation Reference Signal, DM-RS, comprising a DM-RS pattern, wherein positions in the DM-RS pattern are associated with at least one antenna port for transmission of the information entity. The method includes defining, for at least one subframe, a set of at least two distinct DM-RS patterns, assigning one DM-RS pattern, from the defined set of DM-RS patterns, to the receiver, and transmitting the information entity on the at least one antenna port associated with the assigned DM-RS pattern.

8 Claims, 9 Drawing Sheets

(56) References Cited

U.S. PATENT DOCUMENTS

2013/0194931 A1* 8/2013 Lee .................. H04L 5/0053
 370/241
2015/0003356 A1* 1/2015 Seo .................. H04L 5/0048
 370/329

OTHER PUBLICATIONS

61678612 Provisional Specification.*
61555961 Provisional Specification.*
"3rd Generation Partnership Project; Technical Specification Group Radio Access Network; Evolved Universal Terrestrial Radio Access (E-UTRA); Physical Channels and Modulation (Release 10)", 3GPP TS 36.211 v10.5.0, Jun. 2012, 101 pages.
"Minimising the impact of cross carrier scheduling on blind decoding", NEC Group, 3GPP TSG-RAN WG1 Meeting #60, Feb. 22-26, 2010, 3 pages.
"Discussion about restriction on transmission mode number for CA", Potevio, 3GPP TSG RAN WG1 Meeting #60bis, Apr. 12-16, 2010, 4 pages.
"Demodulation RS in Downlink Backhaul", LG Electronics Inc., TSG-RAN WG1 Meeting #60b, Apr. 12-16, 2010, 5 pages.
"On remaining details of DMRS for rank 2", Ericsson, 3GPP TSG RAN WG1 Meeting #63, Nov. 15-19, 2010, 5 pages.
"Details of CQI definition for LTE-A", Samsung, 3GPP TSG RAN WG1 #63, Nov. 15-19, 2010, 8 pages.
"DMRS indication in DL enhanced multiple antenna transmission", CMCC, 3GPP TSG-RAN WG1 #60, Feb. 22-26, 2010, 7 pages, R1-101383.
"Additional Carrier Types: Extension carrier", NEC Group, TSG-RAN WG1 #66bis, Oct. 10-14, 2011, 4 pages, R1-113226.
"Details of Reference Signals for E-PDCCH", LG Electronics, 3GPP TSG RAN WG1 Meeting #68bis, Mar. 26-30, 2012, 6 pages, R1-121453.
"Discussions on the association between antenna ports and ePDCCH", LG Electronics, 3GPP TSG RAN WG1 Meeting #69, May 21-25, 2012, 6 pages, R1-122304.
"Discussion on DMRS usage for enhanced PDCCH", ZTE, 3GPP TSG RAN WG1 Meeting #69, May 21-25, 2012, 8 pages, R1-122101.
"DMRS Port Assignment to E-PDCCH and Channel Estimation Complexity", Research in Motion, UK Limited, 3GPP TSG RAN WG1 Meeting #69, 6 pages, R1-122723.
Huawei, "LTE-A downlink DM-RS pattern design" 3GPP TSG RAN WG1 meeting #57bis, R1-092363, XP050350882A, Jun. 29-Jul. 3, 2009, 12 pages.
LG Electronics, "Remaining issues for DL DM-RS Design", 3GPP TSG RAN WG1 Meeting #59bis, R1-100646, XP050418245, Jan. 18-22, 2010, 6 pages.
Samsung, "Discussion on DM-RS for LTE-Advanced", 3GPP TSG RAN WG1 #57, R1-092205, XP050597466, May 4-9, 2009, 6 pages.
Koivisto et al., "Reference signal design for flexible MIMO operation in LTE-Advanced downlink" 2010 IEEE Vehicular Technology Conference (VTC 2010-Spring), XP031696190, May 16-19, 2010, 5 pages.

* cited by examiner 100
110 Receive
130 Cell
120 Radio network node

Subcarriers

DM-RS ports 7, 8, 11, 13

OFDM Symbols

METHODS AND NODES IN A WIRELESS COMMUNICATION SYSTEM

CROSS-REFERENCE TO RELATED APPLICATIONS

This application is a continuation of International Application No. PCT/EP2012/065756, filed on Aug. 10, 2012, which is hereby incorporated by reference in its entirety.

TECHNICAL FIELD

Implementations described herein relate generally to a radio network node, a method in a radio network node, a receiver and a method in a receiver. In particular is herein described a mechanism for transmission of information, from the radio network node to the receiver, on an antenna port associated with a DM-RS pattern assigned to the receiver.

BACKGROUND

A receiver, also known as User Equipment (UE), mobile station, wireless terminal and/or mobile terminal is enabled to communicate wirelessly in a wireless communication system, sometimes also referred to as a cellular radio system. The communication may be made e.g. between two receivers, between a receiver and a wire connected telephone and/or between a receiver and a server via a Radio Access Network (RAN) and possibly one or more core networks.

The receiver may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server.

The wireless communication system covers a geographical area which is divided into cell areas, with each cell area being served by a radio network node, or base station e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. A cell is the geographical area where radio coverage is provided by the radio network node/base station at a base station site. One radio network node, situated on the base station site, may serve one or several cells. The radio network nodes communicate over the air interface operating on radio frequencies with the receivers within range of the respective radio network node.

In some radio access networks, several radio network nodes may be connected, e.g. by landlines or microwave, to a Radio Network Controller (RNC) e.g. in Universal Mobile Telecommunications System (UMTS). The RNC, also sometimes termed Base Station Controller (BSC) e.g. in GSM, may supervise and coordinate various activities of the plural radio network nodes connected thereto. GSM is an abbreviation for Global System for Mobile Communications (originally: Groupe Special Mobile).

In 3rd Generation Partnership Project (3GPP) Long Term Evolution (LTE), radio network nodes, which may be referred to as eNodeBs or eNBs, may be connected to a gateway e.g. a radio access gateway, to one or more core networks.

In the present context, the expressions downlink, downstream link or forward link may be used for the transmission path from the radio network node to the receiver. The expression uplink, upstream link or reverse link may be used for the transmission path in the opposite direction i.e. from the receiver to the radio network node.

In order to divide forward and reverse communication channels on the same physical communications medium, when communicating in the wireless communication system, a duplexing method may be applied such as e.g. Frequency-Division Duplexing (FDD) and/or Time-Division Duplexing (TDD). The FDD approach is used over well separated frequency bands in order to avoid interference between uplink and downlink transmissions. In TDD, uplink and downlink traffic are transmitted in the same frequency band, but in different time intervals. The uplink and downlink traffic is thus transmitted separated from each other, in the time dimension in a TDD transmission, possibly with a Guard Period (GP) in between uplink and downlink transmissions. In order to avoid interference between uplink and downlink, for radio network nodes and/or receivers in the same area, uplink and downlink transmissions between radio network nodes and receivers in different cells may be aligned by means of synchronization to a common time reference and use of the same allocation of resources to uplink and downlink.

In order to enable coherent demodulation of data, the radio network node (e.g., eNodeB) has to send a pre-defined reference signal, aka pilot signal, to the receiver (e.g., UE). The reference signal may not encode any information and it is typically known to the receiver, e.g. by being predefined. Using a priori information on the modulation symbols and time-frequency location of the transmitted reference signal, the receiver may, based on the received reference signal, obtain channel estimates (e.g., the phase and amplitude of the channel frequency response), which may be used for channel equalization prior to the demodulation.

In the prior art 3GPP LTE system, multiple transmit and receive antennas are supported and the notion of antenna port is used. Each downlink antenna port is associated with a unique reference signal. An antenna port may not necessarily correspond to a physical antenna and one antenna port may be associated with more than one physical antenna. In any case, the reference signal may be used for channel estimation for data that is transmitted on the same antenna port. Channel estimation therefore may be performed for all antenna ports that are used for the data transmission.

In LTE, the smallest time-frequency entity that can be used for transmission is referred to as a Resource Element (RE), which may convey a complex-valued modulation symbol on a subcarrier. A Resource Block (RB) comprises a set of REs and is of 0.5 ms duration (e.g., 7 Orthogonal Frequency-Division Multiplexing (OFDM) symbols) and 180 kHz bandwidth (e.g., 12 subcarriers with 15 kHz spacing). The transmission bandwidth of the system is divided into a set of RBs. Each transmission of user data is performed over 1 ms duration (which is also referred to as a subframe) on one or several RBs.

OFDM is a method of encoding digital data on multiple carrier frequencies. OFDM is a Frequency-Division Multiplexing (FDM) scheme used as a digital multi-carrier modulation method. A large number of closely spaced orthogonal sub-carrier signals are used to carry data. The data is divided into several parallel data streams or channels, one for each sub-carrier.

OFDM has developed into a popular scheme for wideband digital communication, whether wireless or over copper wires, used in applications such as digital television and audio broadcasting, Digital Subscriber Line (DSL; originally: Digital Subscriber Loop) broadband internet access, wireless networks, and 4G mobile communications.

A number of reference signals have been defined in the LTE downlink, such as e.g.:

Common Reference Signal (CRS)

CRS is a cell-specific reference signal, which is transmitted in all subframes and in all RBs of the carrier. The CRS serves as a reference signal for several purposes, comprising inter alia: demodulation; Channel state information measurements; Time- and frequency synchronization, and/or Radio Resource Management (RRM) and mobility measurements.

Up to 4 CRS antenna ports may be accommodated. Since the CRS provides for multiple purposes, it has to be rather robust and hence has quite a large density. The disadvantage is that its overhead is significant, which deteriorates the general efficiency of the wireless communication system, as resources that otherwise may be utilized for transmitting data are dedicated to reference signalling of CRS.

With multiple antennas, it is possible to achieve beamforming by applying different complex-valued precoder weights on the different antennas. However, since the CRS is cell-specific, it cannot be UE-specifically precoded, i.e., it cannot achieve any beamforming gains. On the other hand, the user data on a data channel such as e.g. the Physical Downlink Shared Channel (PDSCH) may undergo beamforming since it is not cell-specific.

A different approach for reference signal design was subsequently introduced in the LTE system, comprising two new reference signals, each having a specific purpose.

Channel State Information Reference Signal (CSI-RS)

CSI-RS is a sparse UE-specific reference signal used only for estimating channel state information by means of a transmission quality indicator such as e.g., Channel Quality Indicator (CQI), Precoding Matrix Indicator (PMI) and/or Rank Indication (RI), which the receiver reports to the radio network node (eNodeB). The CSI-RS may be transmitted in all RBs of the carrier but with a configurable period in time and it is much sparser than the CRS. Up to 8 CSI-RS antenna ports may be accommodated.

Demodulation Reference Signal (DM-RS)

DM-RS is a receiver-specific reference signal used only for phase and amplitude reference for coherent demodulation, i.e., to be used in channel estimation. In contrast to the CRS, it is only transmitted in the RBs and subframes where the receiver has been scheduled data (i.e., containing the PDSCH). Up to 8 DM-RS antenna ports may be accommodated. The antenna ports (labelled 7-14) are multiplexed both in frequency and by orthogonal cover codes. Since it is receiver-specific, the DM-RS may be precoded with the same precoder used for the PDSCH, hence beamforming gains could be achieved for the reference signal. When using the same precoder for the data symbols as for the reference signal symbols, the precoding becomes transparent to the receiver which may observe the precoder as part of the channel. Hence, the precoder is not signalled to the receiver. Typically different precoders may be used in different RBs, implying that channel estimates cannot be interpolated between RBs. However, the system may configure the UE such that the same precoder is used on a set of contiguous RBs (i.e., RB bundling). This allows interpolation in frequency domain between RBs in order to enhance channel estimation performance. In the time-domain, no such precoder restrictions apply and channel estimation interpolation between subframes cannot be performed.

Additionally, the DM-RS is also utilized for demodulation reference for some of the downlink control channels, e.g., the enhanced Physical Downlink Control Channel (ePDCCH) which does not apply CRS-based demodulation. There is currently no standardized transmit diversity scheme for the ePDCCH, which is in contrast to the PDCCH. Under severe channel conditions, the performance of the ePDCCH may therefore be worse than the CRS-based PDCCH. In the absence of a CRS, it is therefore crucial that the DM-RS supports reliable operation of the ePDCCH.

In the legacy LTE system, at least one CRS port is always transmitted, regardless of the number of configured CSI-RS antenna ports and DM-RS antenna ports. Thus even if DM-RS is used as a reference signal for demodulation, the CRS is transmitted.

Furthermore, the LTE system is capable of carrier aggregation, wherein the receiver may simultaneously receive on multiple downlink component carriers (or serving cells, as they also may be referred to as). One of the serving cells/carriers is referred to as the Primary Cell (PCell) and the other cells/carriers are Secondary Cells (SCells). It has been proposed to define cells (e.g., SCells) which do not transmit any CRS antenna port. Therefore, for such cells, data channel and downlink control channel transmissions would have to rely upon DM-RS based demodulation.

PRIOR ART

The DM-RS time-frequency patterns for LTE are defined in the Technical Specification: 3GPP TS36.211 (retrievable over the Internet from: http://www.3gpp.org).

FIG. 1 illustrates the DM-RS pattern used for both FDD and TDD for all normal subframes, for cells that are configured with normal cyclic prefix length. Antenna ports 7, 8, 11 and 13 are transmitted on the same REs and are separated by different orthogonal sequences. Antenna ports 9, 10, 12 and 14 are transmitted on another set of REs and are separated by different orthogonal sequences.

For TDD, the frame structure comprises, in addition to normal subframes, special subframes which contain a first part for downlink transmissions; Downlink Pilot Time Slot (DwPTS), a second part for Guard Period (GP) and last part for uplink transmissions; Uplink Pilot Time Slot (UpPTS). The duration of the different parts may vary and may be configurable by the system.

Additional DM-RS patterns may be used in the special subframes, which situation is illustrated in FIG. 2. The main difference between the DM-RS pattern illustrated in FIG. 2, in comparison with the previously discussed example DM-RS pattern illustrated in FIG. 1 is that another set of OFDM symbols contain the DM-RS symbols. The time-frequency positions of the DM-RS symbols are to be placed such that accurate channel estimates are obtainable on all REs of the RB. However, for these patterns, a number of other constraints have also been part of the design. For example, the DM-RS symbols may not be placed in the same OFDM symbols as the CRS.

Moreover, in the LTE system, there is a downlink control region where control channels (e.g., PDCCH) may be transmitted in the 4 first OFDM symbols of the subframe and the DM-RS cannot be placed in those OFDM symbols. In the special subframes for TDD, the downlink control region is shorter than in normal subframes. The DM-RS symbols could therefore be located earlier in the subframe, as can be seen when comparing the illustrated examples of DM-RS patterns in FIG. 2 and FIG. 1, respectively. Furthermore, the DwPTS constitutes a set of OFDM symbols in the beginning of the subframe and the DM-RS cannot be located outside this set of symbols (i.e., in the GP or UpPTS).

In the prior art LTE system, the DM-RS is only transmitted in the RBs wherein the PDSCH has been scheduled for the receiver. In FDD, the DM-RS pattern is the same in all subframes. In TDD, the DM-RS pattern is the same as for FDD in all normal subframes but different patterns are used in the special subframes. In any given subframe, the DM-RS pattern is the same for all receivers.

Problems of Prior Art Solutions

In the legacy LTE system, both CRS and DM-RS are transmitted, which leads to high overhead, decreased throughput and reduced overall system efficiency.

It is a problem to provide accurate and robust channel estimates, for both the data channel and the control channels, under all kinds of situations wherein the signal propagation conditions may vary, while not resulting in excessive overhead.

Hence, it is a general problem to assure that there is a reasonable trade-off between DM-RS overhead and performance.

SUMMARY

It is therefore an object to obviate at least some of the above mentioned disadvantages and to improve the performance in a wireless communication system.

According to a first aspect, the object is achieved by a method in a radio network node, for transmission of an information entity, over at least one antenna port, in a subframe comprising a plurality of time-frequency resources. The information entity is to be received by a receiver in a wireless communication system. Demodulation of the information entity by the receiver is enabled by also transmitting a Demodulation Reference Signal (DM-RS) comprising a DM-RS pattern, comprising a set of positions of said time-frequency resources. The positions in the DM-RS pattern are associated with at least one antenna port for transmission of the information entity. The method comprises defining, for at least one subframe, a set of at least two distinct DM-RS patterns. Further, the method comprises assigning one DM-RS pattern, from the defined set of DM-RS patterns, to the receiver. In addition, the method comprises transmitting the information entity on the at least one antenna port associated with the assigned DM-RS pattern. A DM-RS is characterised by being transmitted in the same RBs as the associated information entity. When in this context referring to patterns, e.g. the illustrations in FIG. 1 and FIG. 2 are examples of two distinct DM-RS patterns, wherein each respective pattern is associated with a number of antenna ports.

According to a second aspect, the object is achieved by a radio network node, for transmission of an information entity, over at least one antenna port, in a subframe comprising a plurality of time-frequency resources. The information entity is to be received by a receiver in a wireless communication system. Demodulation of the information entity by the receiver is enabled by also transmitting a Demodulation Reference Signal (DM-RS) comprising a DM-RS pattern comprising a set of positions of said time-frequency resources. The positions in the DM-RS pattern are associated with at least one antenna port for transmission of the information entity. The radio network node comprises a processing circuit. The processing circuit is configured for defining, for at least one subframe, a set of at least two distinct DM-RS patterns. Further the processing circuit is configured for assigning one DM-RS pattern, from the defined set of DM-RS patterns, to the receiver. Also, the radio network node comprises a transmitting unit, configured for transmitting the information entity on the at least one antenna port associated with the assigned DM-RS pattern.

According to a third aspect, the object is achieved by a method in a receiver. The receiver is configured for reception of an information entity, over at least one antenna port, in a subframe comprising a plurality of time-frequency resources. The information entity is transmitted by a radio network node in a wireless communication system, wherein demodulation of the information entity is enabled by also receiving a Demodulation Reference Signal (DM-RS), comprising a DM-RS pattern comprising a set of positions of said time-frequency resources. The positions in the DM-RS pattern are associated with at least one antenna port for reception of the information entity. The method comprises acquiring information related to a DM-RS pattern to be utilized for channel estimation. Further, the method comprises receiving the information entity from the radio network node on an antenna port associated with the DM-RS pattern to be utilized for channel estimation.

According to a fourth aspect, the object is achieved by a receiver. The receiver is configured for reception of an information entity, over at least one antenna port, in a subframe comprising a plurality of time-frequency resources. The information entity is transmitted by a radio network node in a wireless communication system, wherein demodulation of the information entity is enabled by also receiving a Demodulation Reference Signal (DM-RS) comprising a DM-RS pattern comprising a set of positions of said time-frequency resources. The positions in the DM-RS pattern are associated with at least one antenna port for reception of the information entity. The receiver comprises a processing circuit, configured for acquiring information related to a DM-RS pattern to be utilized for channel estimation. Also, the receiver comprises a receiving unit. The receiving unit is configured for receiving the information entity from the radio network node on an antenna port associated with the acquired DM-RS pattern.

Some advantages according to embodiments herein comprises that network performance is enhanced while maintaining low reference signal overhead. A further advantage of some embodiments is that beamforming is enabled, as the DM-RS patterns may be receiver-specific.

This is achieved by defining a set of distinct DM-RS patterns to be utilized under different conditions. Thus, an appropriate DM-RS pattern may be selected and assigned to a particular receiver in some embodiments, providing accurate and robust channel estimates while keeping overhead low. Thereby is a reasonable trade-off between DM-RS overhead and performance achieved. Thus an improved performance within a wireless communication system is provided.

Other objects, advantages and novel features of the embodiments of the invention will become apparent from the following detailed description.

BRIEF DESCRIPTION OF THE DRAWINGS

Embodiments of the invention are described in more detail with reference to attached drawings illustrating examples of embodiments in which.

DETAILED DESCRIPTION

Embodiments of the invention described herein are defined as a radio network node, a method in a radio network node, a receiver and a method in a receiver, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 3:
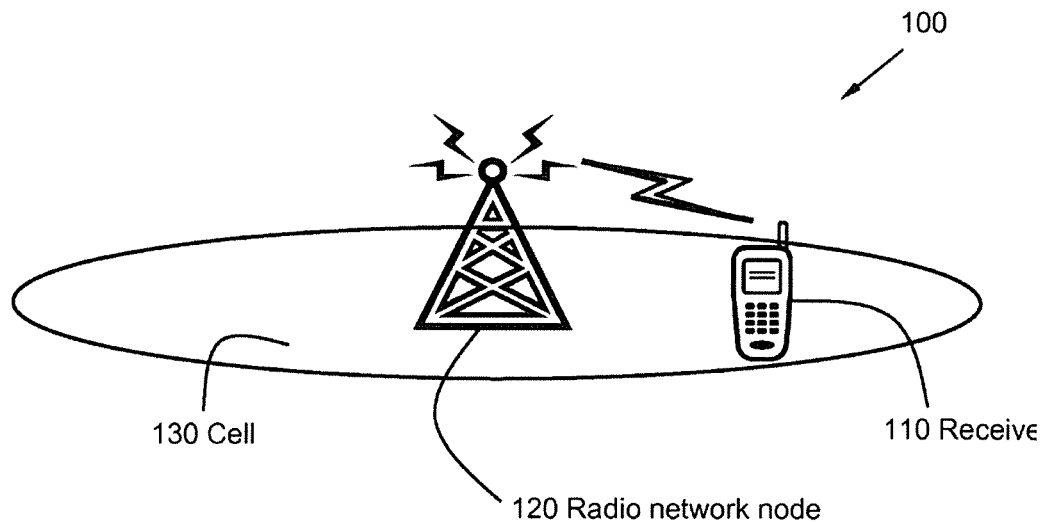
FIG. 3 is a block diagram illustrating an embodiment of the invention.

FIG. 3 is a schematic illustration over a wireless communication system 100. The wireless communication system 100 may at least partly be based on radio access technologies such as e.g. 3GPP LTE, LTE-Advanced, Evolved Universal Terrestrial Radio Access Network (E-UTRAN), Universal Mobile Telecommunications System (UMTS), Global System for Mobile Communications (originally: Groupe Spècial Mobile) (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few options.

The wireless communication system 100 may be configured to operate according to the TDD and/or the FDD principle, according to different embodiments.

TDD is an application of time-division multiplexing to separate uplink and downlink signals in time, possibly with a Guard Period situated in the time domain between the uplink and downlink signalling. FDD means that the transmitter and receiver operate at different carrier frequencies, as have previously been discussed.

The purpose of the illustration in FIG. 3 is to provide a simplified, general overview of the methods and nodes, such as radio network node and receiver herein described, and the functionalities involved. The methods, radio network node and receiver will subsequently, as a non-limiting example, be described in a 3GPP/LTE environment, but the embodiments of the disclosed methods, radio network node and receiver may operate in a wireless communication system 100 based on another access technology such as e.g. any of the above enumerated. Thus, although the embodiments of the invention are described based on, and using the lingo of, 3GPP LTE systems, it is by no means limited to 3GPP LTE.

The illustrated wireless communication system 100 comprises a receiver 110 and a radio network node 120, which is serving a cell 130.

The radio network node 120 controls the radio resource management within the cell 130, such as e.g. allocating radio resources to the receiver 110 within the cell 130 and ensuring reliable wireless communication between the radio network node 120 and the UE 110. The radio network node 120 may typically comprise an eNodeB, e.g. in an LTE-related wireless communication system 100.

The receiver 110 is configured to transmit radio signals comprising information to be received by the radio network node 120. Correspondingly, the receiver 110 is configured to receive radio signals comprising information transmitted by the radio network node 120.

It is to be noted that the illustrated network setting of one receiver 110 and one radio network node 120 in FIG. 3 is to be regarded as a non-limiting example of an embodiment only. The wireless communication system 100 may comprise any other number and/or combination of radio network nodes 120 and/or receivers 110, although only one instance of a receiver 110 and a radio network node 120, respectively, are illustrated in FIG. 3, for clarity reasons. A plurality of receivers 110 and radio network nodes 120 may further be involved in some embodiments of the disclosed invention.

Thus whenever "one" or "a/an" receiver 110 and/or radio network node 120 is referred to in the present context, a plurality of receivers 110 and/or radio network nodes 120 may be involved, according to some embodiments.

The receiver 110 may be represented by e.g. a UE, a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 120, according to different embodiments and different vocabulary.

The radio network node 120 may according to some embodiments be referred to as e.g. base stations, NodeBs, evolved NodeBs (eNBs or eNodeBs), base transceiver stations, Access Point Base Stations, base station routers, Radio Base Stations (RBSs), macro base stations, micro base stations, pico base stations, femto base stations, Home eNodeBs, sensors, beacon devices, relay nodes repeaters or any other network nodes configured for communication with the receiver 110 over a wireless interface, depending e.g. of the radio access technology and terminology used.

Embodiments of the invention herein disclose receiver-specific reference signals for coherent demodulation, such as Demodulation Reference Signals (DM-RS). The DM-RS are configured to support a multitude of scenarios, such as providing reference signals for both data channel demodulation (e.g., PDSCH demodulation) and/or for demodulation of a control channel (e.g., ePDCCH demodulation) in some embodiments, in particular in a scenario wherein no versatile cell-specific CRS is available and may be used instead of the DM-RS.

The embodiments of the invention is further applicable to any channel that utilizes DM-RS for demodulation, including, e.g., channels comprising broadcast information or system information.

Figure 1:
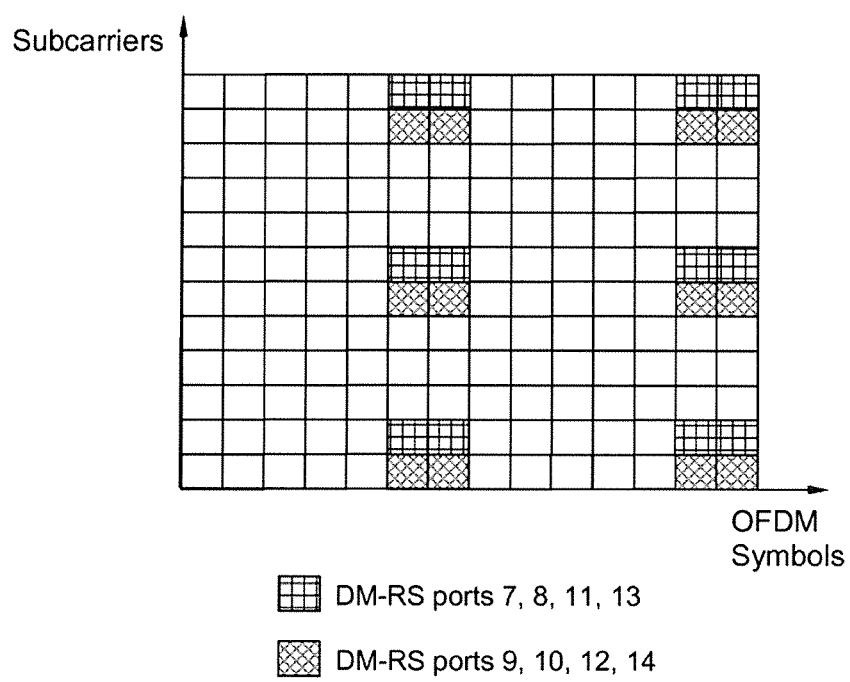
FIG. 1 is a block diagram illustrating a reference signal pattern in a resource block according to prior art.
Figure 2:
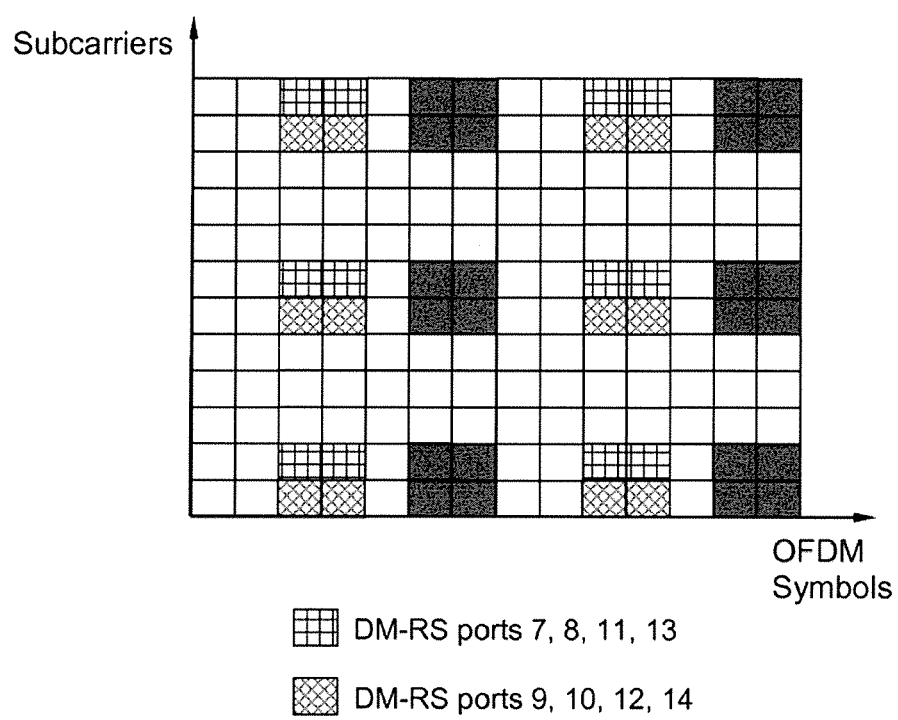
FIG. 2 is a block diagram illustrating a reference signal pattern in a resource block according to prior art.

In the receiver 110, in some embodiments, channel estimates may firstly be obtained for each antenna port for the REs that contain the DM-RS. Subsequently, time- and frequency domain interpolation or extrapolation may be performed to derive channel estimates for all other REs of the scheduled RBs. Typically, the farther distance (in time- and frequency) between a RE and the RE carrying the DM-RS, the worse the channel estimate will become. When studying the previously presented FIG. 1, it may be noticed that there are no DM-RS symbols in the first 5 OFDM symbols. Hence, in a time-varying channel, the channel estimates for the REs in those OFDM symbols may become inaccurate and the performance of the data or control channels could be deteriorated. This may occur when there is no control region occupying some of the first OFDM symbols in the subframe and these symbols are used for transmitting, e.g., a data channel or DM-RS based control channel. On the other hand, the DM-RS pattern shown in FIG. 2 has a more even distribution of the DM-RS symbols in time, suggesting better interpolation accuracy which renders better channel estimation performance in the absence of a control region occupying some of the first OFDM symbols, as illustrated in FIGS. 1 and 2.

The robustness of the CRS is contingent on that it is transmitted in every subframe and in every RB. This allows a continuous interpolation of channel estimates in both time- and frequency dimensions that result in better channel estimates. For example, prior art includes elaborated channel estimation algorithms based on Wiener filtering. For the DM-RS, the interpolation opportunities may be more limited in comparison, making channel estimates vulnerable to variations in the channel, e.g., as a consequence of high UE speed or low Signal to Interference plus Noise Ratio (SINR). Typically, interpolation/extrapolation may only be performed for REs within a RB when DM-RS is used. To provide good channel estimates in all cases, it may be necessary to increase the density of the DM-RS pattern compared to the legacy LTE system in order to improve the channel estimation reliability, at least in some scenarios as will be further explained.

Thus, a dense DM-RS pattern offers good channel estimation performance. On the other hand a dense DM-RS pattern may not always be needed and may create large overhead which is detrimental to throughput performance. A receiver 110 that is scheduled with high-order Multiple Input Multiple Output (MIMO) and/or modulation and coding is likely having a very large SINR and experiencing low mobility (rendering low, insignificant, negligible or no Doppler spread). Hence, the need for a dense DM-RS pattern may not be necessary in that case, as it may be superfluous and merely add redundant overhead. It would therefore be a benefit to have the opportunity to reduce the density of the DM-RS and instead use those REs for data transmission, i.e. to adjust the density of the DM-RS pattern based on the signal propagation conditions of the receiver 110, such as SINR, Doppler spread, Reference Signal Received Power (RSRP), Reference Signal Received Quality (RSRQ), Received Signal Strength Indicator (RSSI) or any other appropriate measurement related to the signal propagation conditions in the radio interface between the receiver 110 and the radio network node 120.

Another purpose according to some embodiments is to provide multi-subframe scheduling. In the prior art LTE system, for dynamic scheduling, the data channel, or PDSCH as it also may be referred to, is transmitted in one subframe and the associated downlink control channel (PDCCH or ePDCCH) is located in the same subframe. However, according to embodiments of the invention, the downlink control channel overhead is reduced by letting one PDCCH or ePDCCH schedule the PDSCH in more than one subframe. An advantage of this is that more time-frequency resources could be used for data transmission. Some embodiments of the invention disclose that one option for cross-subframe scheduling is to use the same precoder in at least two, or possibly all, scheduled subframes for a given RB. Such embodiments are offering time-domain RB bundling wherein channel estimates may be interpolated between subframes and thereby improve the channel estimation. The DM-RS pattern depicted in FIG. 2 may be suitable for such time-domain bundling since the distance in time between the DM-RS symbol groups within the subframe is the same as the distance in time between the DM-RS symbol groups of consecutive subframes, i.e., there are 5 OFDM symbols not containing DM-RS symbols located between the groups of 4 REs containing the DM-RS symbols.

The above observations imply that one single DM-RS pattern will not efficiently support the various kinds of transmissions that may be foreseen, especially, in the absence of other reference signals such as cell-specific reference signals, CRS, which may be the case e.g. when applying carrier aggregation as previously discussed. According to some embodiments of the invention, a set of at least two DM-RS patterns, in at least one subframe, is defined from which the receiver 110 is assigned one DM-RS pattern. It is further realized that the introduction of new DM-RS patterns may be efficiently done even in existing systems 100, since the DM-RS is only transmitted in the RBs associated with the data or control channel for which the DM-RS should serve as a demodulation reference. Hence, existing receivers 110 not being aware of any new DM-RS pattern may still be able to operate on the carrier, since they instead may use DM-RS patterns being defined already.

Thus, in some embodiments, the assignment of DM-RS pattern form is receiver-specific.

This implies that in a subframe, different receivers 110 may utilize different DM-RS patterns in a serving cell in some embodiments. This gives large flexibility and may require signalling for defining the assignment, as the DM-RS pattern is adaptable to the radio signalling conditions for each receiver 110 within the cell 130. An advantage is that it allows for receivers 110 having different capabilities in terms of supporting different number of DM-RS patterns. For example, if a receiver 110 does not support the highest order MIMO, modulation and coding schemes, it may not need to be capable of channel estimation for a DM-RS pattern that is tailored to such cases.

In some embodiments, carrier aggregation is applied. Thus a first serving cell may be configured to comprise CRS transmission and the second serving cell may be configured to comprise a carrier type not comprising CRS transmission. In that case, the union of the sets of DM-RS patterns for the different carriers may comprise at least two distinct DM-RS patterns. Another option, according to some embodiments, may be that there are multiple cell-specific sets but the assignment from the sets is receiver-specific.

The radio network nodes 120, or eNodeBs, may still be configured, or prefer to assign the same DM-RS pattern to different receivers 110 under certain conditions. For example, if Multi User MIMO (MU-MIMO) is performed, multiple receivers 110 transmit their data channels on the same set of RBs. In that case, it may be advantageous that the assigned DM-RS patterns are equal in order to assure orthogonal reference signals.

Thus, in some embodiments, the assignment of DM-RS pattern set may be cell-specific for at least a subgroup of receivers 110.

According to some embodiments, each serving cell may be configured with its own set of DM-RS patterns such that all receivers 110 on the cell 130 may be assigned the same DM-RS pattern. One example of this is where receivers 110 are assigned one DM-RS pattern in a given serving cell, whereas receivers 110 are assigned another DM-RS pattern in another cell. This may require less signalling for defining the assignment. A first cell may be corresponding to a legacy carrier comprising CRS transmission and the second cell may be corresponding to a carrier type not comprising CRS transmission. A receiver 110 that is capable of carrier aggregation may aggregate such two different types of carriers and may thus be assigned different DM-RS patterns on the difference carriers, according to some embodiments.

It may be noted that although the discussion here is in terms of DM-RS (or DM-RS patterns), it may be possible to use the terminology of antenna ports instead, or in addition according to some embodiments. For example a new DM-RS pattern, e.g., as subsequently exemplified above and illustrated in FIGS. 4-6, may be labelled as a set of new antenna ports.

Figure 4:
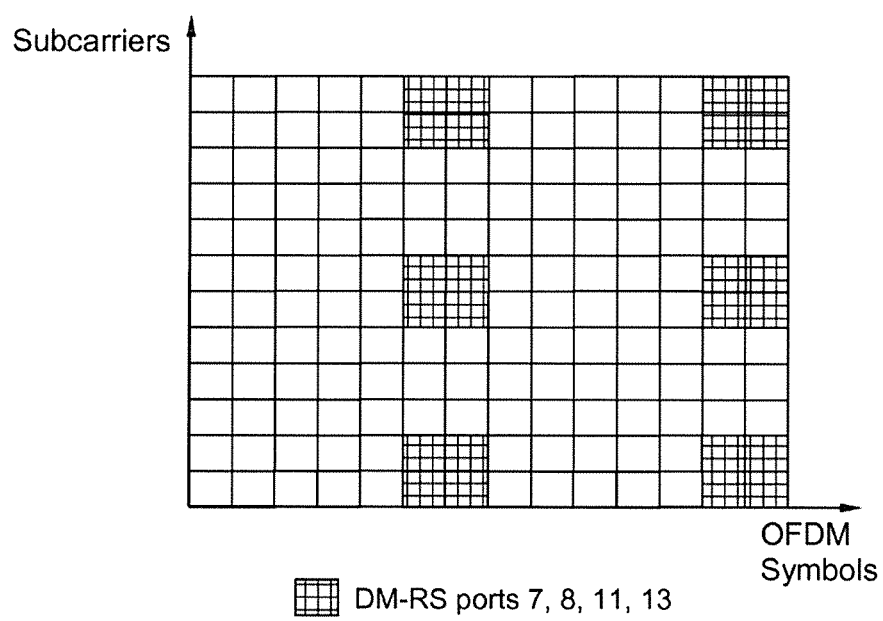
FIG. 4 is a block diagram illustrating a reference signal pattern in a resource block according to an embodiment.

FIG. 4 illustrates an example of a DM-RS pattern over a time-frequency space comprising 168 REs resulting from 14 OFDM symbols (x-axis) and 12 subcarriers (y-axis). The DM-RS pattern density has been increased for antenna ports 7, 8, 11 and 13 by reusing the REs from antenna ports 9, 10, 12 and 14.

Figure 5:
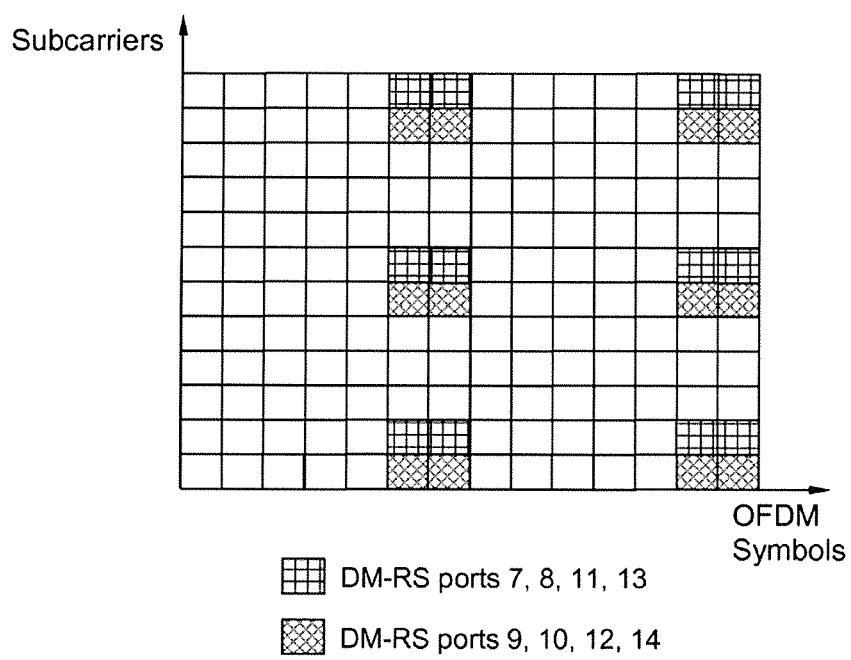
FIG. 5 is a block diagram illustrating a reference signal pattern in a resource block according to an embodiment.

FIG. 5 illustrates an example of a DM-RS pattern over a time-frequency space comprising 168 REs resulting from 14 OFDM symbols (x-axis) and 12 subcarriers (y-axis). The DM-RS pattern density has been decreased for all antenna ports.

Figure 6:
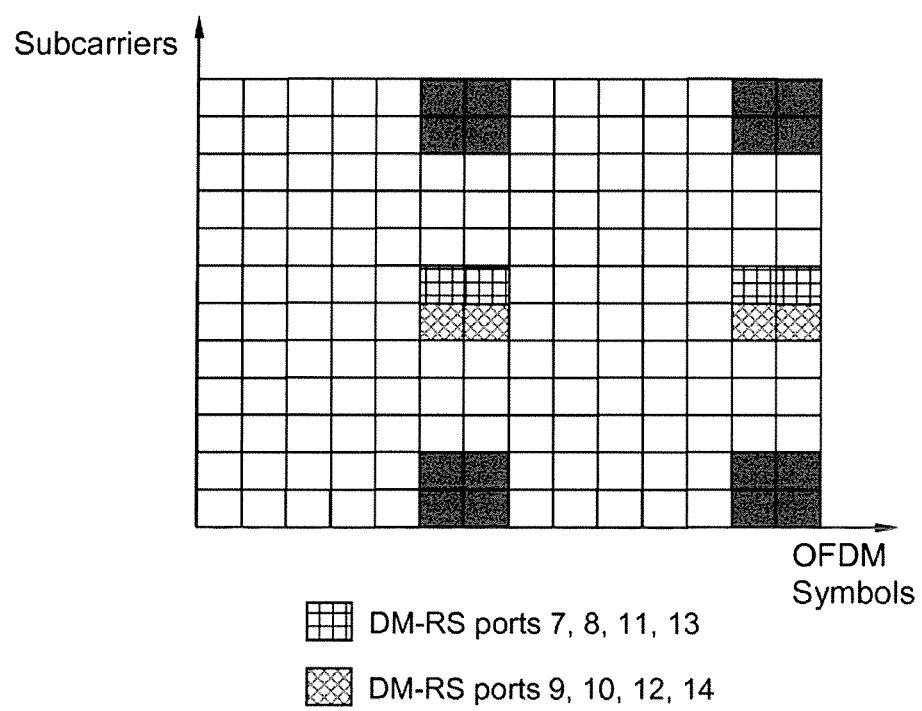
FIG. 6 is a block diagram illustrating a reference signal pattern in a resource block according to an embodiment.

FIG. 6 illustrates an example of a DM-RS pattern over a time-frequency space comprising 168 REs resulting from 14 OFDM symbols (x-axis) and 12 subcarriers (y-axis). The DM-RS pattern density has been decreased for all antenna ports.

According to embodiments of the invention, different receivers 110 may utilize different DM-RS antenna ports being associated with different DM-RS patterns. In the prior art LTE system, rank v (v=1, 2, . . . , 8) transmission on the PDSCH is associated with antenna ports 7 to 6+v, where rank denotes the number of spatial layers or data streams of the transmission. Two different receivers experiencing transmissions with the same rank will utilize the same DM-RS pattern. In contrast to the legacy LTE system, embodiments of this invention discloses that the first receiver 110 which may be utilizing a certain number (N) of DM-RS antenna ports may utilize a different DM-RS pattern compared to another second receiver 110 which may also be utilizing N DM-RS antenna ports, even when the receivers 110 are configured with the same transmission mode. The number N could, e.g., represent the rank of the transmissions. In particular this applies to one or several of antenna ports 7-14 used for PDSCH demodulation, or one or several of antenna ports 107-110 used for ePDCCH demodulation.

In some embodiments in the wireless communication system 100, the first receiver 110 may support one DM-RS pattern in a given subframe and first serving cell but may use different DM-RSs on different serving cells, while different receivers 110 may have different DM-RS patterns. This may in a non-limiting example be applicable e.g., if said different receivers 110 are supporting different system releases. The evolution of wireless communication systems 100 is often characterised by the notion of a system release. The first receiver 110 of the latest system release is supposed to be capable of supporting all mandatory features of that release and previous releases. On the other hand, the second receiver 110, which in this non-limiting example may be of a release not being the latest; may not be able to support features of a later system release. Hence, on a serving cell, any receiver 110 of a previous release may support one set of DM-RS patterns, (e.g., the DM-RS pattern associated with antenna ports 7-14 in LTE) whereas the receiver 110 of a later release may support another set of DM-RS patterns (e.g., a superset including previous system release DM-RS patterns, or even be a disjoint set).

In one embodiment of the invention, the receiver 110 may support at least 2 DM-RS patterns in a given subframe on a serving cell and may be assigned one of them according to predefined rules and/or by signalling means. The predefined rules may, e.g., relate to subframe type (such as normal or special), or any parameters associated with the transmission such as e.g., modulation, code rate, MIMO mode, whether time- or frequency RB bundling is applied, scheduled RB location etc. Furthermore, a predefined rule may be related to the Radio Network Temporary Identifier (RNTI). In the prior art LTE system, the CRC of the downlink control channel is scrambled based on the RNTI. The receiver may have different RNTIs, each related to the type of information associated with the control channel, such as Cell-specific RNTI (C-RNTI), System information RNTI (SI-RNTI), Random access RNTI (RA-RNTI), Paging RNTI (P-RNTI), Semi-persistent scheduling RNTI (SPS-RNTI) and Temporary C-RNTI.

The set of at least 2 DM-RS patterns may, e.g., comprise all existing DM-RS patterns from previous system releases and newer DM-RS patterns of a later system release, e.g., as exemplified above and illustrated in FIGS. 4-6.

If information regarding the set of DM-RS patterns is to be signalled to the receiver 110 through the data channel, the receiver 110 may firstly receive a downlink control channel. That is not a problem if the downlink control channel is based on CRS demodulation. In that case, receiver-specific RRC signalling, which is scheduled by the CRS-based control channel and transmitted through the data channel, may be applied for configuring the DM-RS pattern.

If the downlink control channel (e.g., ePDCCH) assumes DM-RS based demodulation, it may be difficult to correctly receive the control channel without prior knowledge of the DM-RS pattern. In LTE, the receiver 110 is receiving the ePDCCH by blind decoding in either a common search space or a receiver-specific search space, where a search space defines a set of REs on which control channels may be transmitted. The search space is a part of the time-frequency space in a subframe, wherein the receiver 110 continuously monitors and checks for downlink control signals from the radio network node 120. Since all receivers 110 in the cell may search in the common search space, it may be an advantage to utilize the same DM-RS pattern for all receivers 110 in the common search space in order to achieve orthogonality among the antenna ports. One embodiment that solves the issue may therefore be to let the set of DM-RS patterns be predefined for the common search space. That is, it may be possible for the receiver 110 to utilize the DM-RS in the common search space, without prior knowledge on its time-frequency pattern or modulation sequence. Information about additional DM-RS patterns may then be signalled in the PDSCH (i.e., by means of RRC signalling according to some embodiments) being scheduled by a control channel from the common search space. The associated data channel may use the same DM-RS pattern as was used for the control channel in the common search space. The DM-RS pattern used in the common search space may be obtained from a superset of the other DM-RS patterns defined in the set for the receiver 110. For example, a denser DM-RS pattern may be applied in the common search space for maximum reliability. The DM-RS pattern for the receiver-specific search space may by default be the same as for the common search space until otherwise configured.

One embodiment of this invention may comprise having different sets of DM-RS patterns for different channels. For example, the downlink control channels such as e.g., ePDCCH, and the downlink data channels such as e.g., PDSCH, may utilize different DM-RS patterns. For example, the DM-RS patterns for the ePDCCH may be predetermined and the set of at least two DM-RS patterns only apply to the PDSCH. This is advantageous in order to avoid any ambiguity concerning DM-RS pattern in decoding the downlink control channel and to alleviate needs to assign the same DM-RS pattern to receivers 110 that search for the downlink control channel in the same RB. A further advantage of having different sets for the ePDCCH and the PDSCH is that a dynamic assignment (i.e., it may change on the time-scale of subframes) of DM-RS pattern may be provided. Given that a predetermined DM-RS pattern is used for the ePDCCH, a set of at least 2 DM-RS patterns may be configured for the PDSCH. The ePDCCH may carry information (e.g., explicit bits) that indicates which of the configured DM-RS patterns may be used for the scheduled PDSCH according to some embodiments.

According to another embodiment of the invention, the DM-RS patterns may be deduced from the reception of the control channel. Thus the control channel may comprise a set of Cyclic Redundancy Check (CRC) bits which may be scrambled with a codeword (i.e., element-wise multiplication). There may be a number of unique codewords, each unique codeword corresponding to a DM-RS pattern in the set of DM-RS patterns. The radio network node 120 may select the unique codeword corresponding to, or representing the DM-RS pattern that is to be used and scramble it with the CRC bits, thereby encoding which DM-RS pattern to be utilized. The receiver 110 may then obtain this information concerning which DM-RS pattern to be used by descrambling the CRC bits and determine which unique codeword has been used by the radio network node 120 for the scrambling, according to some embodiments. Thereby, information concerning which DM-RS pattern in the set of DM-RS patterns to use may be transmitted from the radio network node 120 to the receiver 110.

For accessing the cell 130, the receiver 110 typically firstly may perform a cell search in which it detects the cell 130 and synchronizes to the corresponding serving radio network node 120. The receiver 110 then continues to receive a broadcast channel which contains the necessary parameters to proceed with reception of radio signals from the serving radio network node 120. In the legacy LTE system, the CRS is used to demodulate the Physical Broadcast Channel (PBCH). If there is no CRS on the carrier, DM-RS based broadcast channel is considered in some embodiments of this invention. The DM-RS pattern may be known prior to demodulating such a broadcast channel according to some embodiments. One embodiment that solves the issue is therefore to let the assigned DM-RS pattern be predefined for a physical broadcast channel. Furthermore, an embodiment is where the receiver 110 acquires information considering the assigned DM-RS pattern for broadcast channel reception during the cell search. For example, if on a carrier without CRS, the synchronization signals are changed (e.g., new positions in time/frequency, new modulation sequences etc.) compared to existing synchronization signals on a legacy carrier with CRS, the receiver 110 may be able to detect that the carrier does not contain CRS and may therefore know e.g. by a predefined rule which DM-RS pattern should be used for physical broadcast channel reception.

Furthermore, during the initial access to the system 100, after having received the broadcast channel, the UE 110 receives system information on the PDSCH e.g., scrambled by System Information Radio Network Temporary Identifier (SI-RNTI), which may be required for being able to establish communication from the radio network node 120. The DM-RS pattern may be known when demodulating the system information in some embodiments. One embodiment that solves the issue is therefore to let the assigned DM-RS pattern be predefined for PDSCH transmissions related to system information.

Furthermore, during the initial access to the system 100, the receiver 110 may receive RACH responses on the PDSCH (e.g., scrambled by RA-RNTI), which may be required for being able to establish communication from the radio network node 120. The DM-RS pattern would need to be known when demodulating RACH response. One embodiment that solves the issue is therefore to let the assigned DM-RS pattern be predefined for PDSCH transmissions related to RACH responses.

According to another embodiment of the invention, the DM-RS patterns may be deduced from the reception of the broadcast channel. In the prior art LTE system, the PBCH comprises a set of Cyclic Redundancy Check (CRC) bits which may be scrambled with a codeword (i.e., element-wise multiplication). There are three unique codewords each encoding the number of CRS ports on the carrier. Thus the receiver 110 may obtain a correct CRC if descrambled with the correct codeword and thereby detect the number of CRS ports. If such information is not needed, e.g. in a scenario wherein CRS is not transmitted, scrambling may be done with codewords encoding information on used DM-RS patterns, according to some embodiments. Thereby, information concerning which DM-RS pattern in the set of DM-RS patterns to use may be transmitted from the radio network node 120 to the receiver 110.

In the following, some further non-limiting examples are given of DM-RS patterns that may be suitable to accommodate the different cases described above.

An increase of DM-RS density may be achieved, according to some embodiments, e.g., by: adding REs for DM-RS symbols to an existing DM-RS pattern and/or by redefining antenna port mapping for an existing DM-RS pattern. An existing DM-RS pattern may comprise a DM-RS pattern included in a previous or current system release.

Yet an embodiment may be realized in the following manner; if the receiver 110 is in need for a denser DM-RS pattern, due to e.g. bad radio channel conditions, it would likely not be scheduled over a large number of antenna ports since such transmission (i.e., high-order MIMO) typically requires favourable channel conditions. A denser DM-RS may be achieved for some antenna port(s) at the expense of less DM-RS for some other antenna port(s), or even discarding some of the antenna ports. For example, the DM-RS pattern with 24 REs of FIG. 1 accommodates up to 8 antenna ports. By redefining the antenna mapping, these 24 REs may be allocated to only 1 antenna port, or less than 8 antenna ports etc. Thereby the DM-RS pattern may be reused but supporting a smaller set of antenna ports. One such example is given in FIG. 4, where the 24 REs accommodate 4 antenna ports instead of 8 antenna ports in the legacy LTE system. It is to be noted that the labelling of the antenna ports is just exemplary and may be different, e.g., it might comprise e.g. a sequential ordering of the antenna ports such as 7, 8, 9 and 10, according to some embodiments. An advantage of keeping the DM-RS pattern and redefining the antenna port mapping is that the receiver 110 may utilize the same channel estimate interpolation/extrapolation algorithm, since the time-frequency positions of the DM-RS are not changed.

A decrease of DM-RS density may be achieved, according to some embodiments, e.g. by: removing DM-RS from some REs in an existing DM-RS pattern.

Such embodiment is illustrated in the previously presented and discussed FIG. 5, wherein only 16 REs of the original 24 REs are used for transmitting the DM-RS. However, this is only an illustration of a non-limiting example, other DM-RS symbols may be removed according to different embodiments. For example, if frequency domain RB bundling is applied, channel estimates may be interpolated in the frequency domain between DM-RS symbols located in consecutive RBs. For any of the DM-RS patterns in FIGS. 1-2, and/or FIGS. 4-5, the distance in frequency between the DM-RS symbols is not uniform considering bundling between consecutive RBs. This may cause uneven accuracy of the channel estimates. The above presented FIG. 6 shows a DM-RS pattern using 8 of the 24 REs for transmitting the DM-RS that may be particularly suited for applying RB bundling resulting in an equidistant placement of DM-RS symbol groups in the frequency domain, according to some embodiments.

Decreased reference signal density may also be useful for multi-subframe scheduling. For example, there might be subframes where there are other channels (e.g., broadcast channels and synchronization signals) and signals using at least one RE occupied by the DM-RS pattern. The DM-RS symbols in the colliding REs may therefore not have to be transmitted. This effectively results in a DM-RS pattern with less density. One option according to some embodiments is thus that the DM-RS from a previous subframe may be utilized in conjunction with the DM-RS of the current subframe. Alternatively, only the DM-RS of the previous subframe may be utilized for the current subframe, and no DM-RS may be transmitted in the current DM-RS subframe, according to some embodiments. This may be referred to as time-domain bundling, or RB bundling.

Thus according to some embodiments of the invention, the DM-RS patterns have symmetries such that when RB bundling is applied, in frequency- and/or time domain, DM-RS symbols may appear uniformly spaced in frequency and time, respectively.

The herein described embodiments are applicable to multi-carrier system such as OFDM or Discrete Fourier Transform Spread (DFTS)-OFDM. Further, embodiments of the invention may be applicable both with and without carrier aggregation. Also, embodiments described herein may be applicable to carriers that are deployable as standalone or to carriers that may only function with carrier aggregation, according to different embodiments.

For enhanced understanding and overview, a brief summary of at least some of the above described embodiments of the invention will be made subsequently.

An aspect of the invention comprises a method in a radio network node 120, for transmission of data and/or control information in a wireless communication system 100 by utilizing receiver-specific Demodulation Reference Signals (DM-RS). The expression receiver-specific may sometimes also be referred to as user-specific, or UE-specific, in some terminology. The method comprises defining, for at least one subframe, a set of at least two different DM-RS patterns. Further, the method comprises assigning one DM-RS pattern, from the defined set of DM-RS patterns, to a receiver 110. Also, the method comprises transmitting said data and/or control information on an antenna port using the assigned DM-RS pattern, which data and/or control information is to be received by the receiver 110.

The receiver 110 is configured to use the assigned DM-RS pattern in channel estimation for coherent demodulation of the data and/or control information which is transmitted from the radio network node 120.

The definition of the set of at least two different DM-RS patterns, i.e. the selection of DM-RS patterns to be comprised in the set may be made based on: information received from the receiver 110 concerning signal propagation conditions, cell-specific signalling, or by pre-defined rules.

Further, some embodiments may comprise adjusting the reference signal density of the DM-RS pattern to be assigned to the receiver 110. Such adjustment may comprise provision of a larger reference signal density e.g. by remapping antenna ports to the DM-RS symbols of an existing DM-RS pattern. However, adjustment of the reference signal density of the DM-RS pattern may alternatively comprise provision of a smaller reference signal density. Smaller reference signal density may be achieved by removing a set of REs from an existing DM-RS pattern, according to some embodiments.

Further, in case RB bundling is applied in the frequency domain and/or the time domain, the receiver 110 may be assigned a DM-RS pattern comprising equidistant DM-RS symbol locations in the frequency domain.

Thereby, embodiments of the invention may support a plurality of scenarios, without being dependent upon cell-specific CRS signalling, such as e.g. absence of legacy downlink control region, adjustment of reference signal density based on the signal propagation conditions of the specific receiver 110, and also multi-subframe scheduling.

Figure 7:
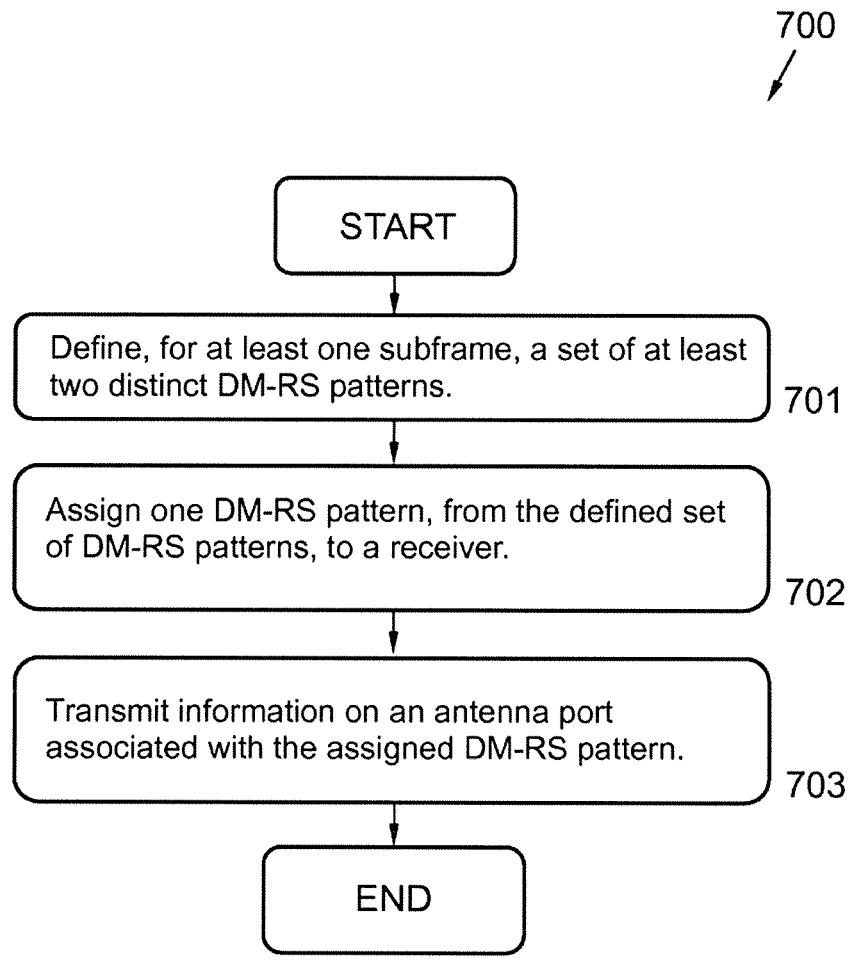
FIG. 7 is a flow chart illustrating a method in a radio network node according to an embodiment of the invention.

FIG. 7 is a flow chart illustrating embodiments of a method 700 for use in a radio network node 120 in a wireless communication system 100. The method 700 aims at transmitting an information entity, over at least one antenna port, in a subframe comprising a plurality of time-frequency resources. These time-frequency resources may also be referred to as Resource Elements (REs), which entities may convey a complex-valued modulation symbol on a subcarrier. The information entity, which may comprise data when transmitted in a data channel and control information when transmitted in a control channel, is to be received by a receiver 110 in the wireless communication system 100. Further, the method 700 also aims at enabling demodulation of the information entity by the receiver 110 by also transmitting a Demodulation Reference Signal (DM-RS) comprising a DM-RS pattern. The DM-RS pattern comprises a set of positions of said time-frequency resources, wherein the positions in the DM-RS pattern are associated with at least one antenna port for transmission of the information entity. According to some embodiments, the positions in the DM-RS pattern may be associated with one antenna port, two antenna ports, four antenna ports or eight antenna ports according to different embodiments. However, particular embodiments may be configured to support another number of antenna ports.

The wireless communication system 100 may be based on Long-Term Evolution (LTE) within the Third Generation Partnership Project (3GPP) according to some embodiments, wherein the radio network node 120 may comprise e.g. an Evolved Node B. The receiver 110 may comprise a User Equipment (UE).

According to some embodiments, resource-block bundling over at least two subframes, may be applied in the time domain. In at least some such embodiments, the same DM-RS pattern may be used for at least two subframes that are bundled together in the time domain.

To appropriately perform the transmission, the method 700 may comprise a number of actions 701-703.

It is however to be noted that any, some or all of the described actions 701-703, may be performed in a somewhat different chronological order than the enumeration indicates, or even be performed simultaneously. The method 700 may comprise the following actions:

Action 701

A set of at least two distinct DM-RS patterns, for at least one subframe, is defined.

At least one channel, such as a data channel and/or a control channel may be associated with a set of at least two distinct DM-RS patterns in some embodiments.

Different sets of DM-RS patterns may be defined on different cells served by the radio network node 120, for a receiver 110 in a multi carrier scenario such that a union of the different sets of the different carriers comprises at least two distinct DM-RS patterns, according to some embodiments.

The set of at least two distinct DM-RS patterns defined for at least one subframe may in some embodiments comprise DM-RS patterns with distinct reference signal densities.

In some embodiments, the set of at least two distinct DM-RS patterns defined for at least one subframe may comprise a first DM-RS pattern with a first reference signal density and a second DM-RS pattern with a second reference signal density. The second reference signal density may be higher than the first reference signal density. Further, the second DM-RS pattern may be created by adding time-frequency resources, for DM-RS symbols to the first DM-RS pattern and/or redefining antenna port mapping for the first DM-RS pattern, in some embodiments.

Further, the set of at least two distinct DM-RS patterns defined for at least one subframe may comprise a first DM-RS pattern with a first reference signal density and a second DM-RS pattern with a second reference signal density, which second reference signal density is lower than the first reference signal density. In those embodiments, the second DM-RS pattern may be created by removing DM-RS symbols from some time-frequency resources in the first DM-RS pattern.

In addition, the set of at least two distinct DM-RS patterns defined for at least one subframe, may comprise DM-RS patterns with distinct distribution of positions of time-frequency resources, in the time domain and/or the frequency domain according to some embodiments.

In at least some such embodiments, the set of at least two distinct DM-RS patterns defined for at least one subframe may comprise a first DM-RS pattern with a first distribution of positions of time-frequency resources in the time domain and/or the frequency domain and a second DM-RS pattern with a second distribution of positions of time-frequency resources in the time domain and/or the frequency domain, which second distribution of positions of time-frequency resources in the time domain and/or the frequency domain may be created by dislocating the first distribution of positions of time-frequency resources in the time domain and/or the frequency domain.

Action 702

One DM-RS pattern, out of the defined 701 set of DM-RS patterns is assigned to the receiver 110.

According to some different embodiments, the assignment of the DM-RS pattern to the receiver 110 may be made by means of predefined rules, known to both the radio network node 120 and the receiver 110.

According to some different embodiments, the assignment of the DM-RS pattern to the receiver 110 may be made by the radio network node 120 and information for enabling the receiver 110 to know which DM-RS pattern to use may be explicitly signalled to the receiver 110, according to some embodiments.

Furthermore, according to some embodiments, a combination of predefined rules and signalling may be applied as will be subsequently exemplified.

The assigned DM-RS pattern may be receiver-specific according to some embodiments, such that, for the at least one subframe, different DM-RS patterns are assignable to different receivers 110.

The assigned DM-RS pattern may be cell-specific according to some embodiments, such that, for the at least one subframe, the same DM-RS patterns are assignable to different receivers 110.

The assigned DM-RS pattern may be cell-specific according to some embodiments, determined by type of reference signals transmitted on that carrier.

The DM-RS pattern may be assigned to the receiver 110 based on a predefined rule in some embodiments. Such predefined rule may relate to any, some, a subset, or all of capability of the receiver 110 in terms of multiple antenna reception; modulation; coding schemes; number of utilized antenna ports of the receiver 110; number of system release of the receiver 110; subframe type; a transmission parameter related to modulation; code rate; MIMO mode; whether time- or frequency bundling is applied; Radio Network Temporary Identifier (RNTI) and/or scheduled Resource Block (RB) location.

The predefined rule may relate to assignment of a predefined DM-RS pattern for a common search space of a downlink control channel, in some embodiments.

The assigned DM-RS pattern may be predefined, according to some embodiments, for a broadcast channel.

Information concerning the assigned DM-RS pattern for broadcast channel reception may be provided to the receiver 110 during the cell search procedure according to some alternative embodiments.

Furthermore, responses made to signalling made by the receiver 110 over a random access channel, according to some embodiments, may be transmitted to the receiver 110 on a data channel, and wherein the assigned DM-RS pattern may be predefined for such transmissions on the data channel, related to responses to receiver-signalling over the random access channel. The random access channel may comprise a Random Access Channel (RACH), e.g. when the invention is embodied in an LTE environment.

A predefined DM-RS pattern may optionally be utilized for a downlink control channel and the defined 701 set of DM-RS patterns may be configured for the data channel. In those embodiments, information may be signalled over the downlink control channel to the receiver 110, indicating which DM-RS pattern, from the defined 701 set of DM-RS patterns that has been assigned to the receiver 110 to be used for the data channel.

Furthermore, in some embodiments, the receiver 110 may be provided with system information on the data channel, to enable communication with the radio network node 120. In such embodiments, the assigned DM-RS pattern may be predefined for data channel transmissions related to system information.

Also, optionally, information regarding the assigned set of DM-RS patterns may be signalled to the receiver 110 by receiver-specific radio resource control signalling in some embodiments.

The assigned DM-RS pattern may in some embodiments be provided to the receiver 110 over a broadcast channel by scrambling a Cyclic Redundancy Check (CRC) entity with a codeword, encoding information on the assigned DM-RS pattern.

The CRC is an error-detecting code which in some embodiments may be calculated on the information and/or data to be transmitted over the wireless interface. Blocks of data for which CRC is calculated get a short check value attached, based e.g. on the remainder of a polynomial division of their contents. When the receiver 110 is receiving the information/data and the attached check sum the CRC calculation algorithm is repeated over the information/data and the achieved result may be compared with the attached check sum received from the radio network node 120.

According to some, embodiments, the CRC check sum is scrambled with a codeword, representing the DM-RS pattern that is assigned to the receiver 110. Such scrambling may be accomplished by the addition or multiplication of components to the original CRC check sum, or the changing of some important component of the CRC check sum in order to make the differently scrambled CRC check sums distinguishable from each other. Thus each DM-RS pattern in the set of DM-RS patterns may be associated with a corresponding codeword. Consequently, when the receiver 110 receives the data and the attached scrambled CRC check sum, it may apply the CRC calculation algorithm over the received information/data, scramble it with a first codeword and compare the result with the attached scrambled CRC check sum received from the radio network node 120. If they correspond, the receiver 110 knows that the DM-RS pattern associated with the first codeword is to be used. If they do not correspond, the above outlined procedure may be repeated until a match is found, or until scrambling and comparison with all codewords have been made without encountering any successful matching. In such case, the receiver 110 may request a retransmission from the radio network node 120 as a transmission error may have occurred.

Further, according to some embodiments wherein resource block bundling is applied, in frequency and/or time domain, the assigned DM-RS pattern may comprise DM-RS symbols uniformly spaced in frequency and/or time domains respectively.

Further, according to some optional embodiments, multiple-cell specific sets of at least two distinct DM-RS patterns may be defined 701, while the assignment of DM-RS patterns from the defined 701 set may be receiver-specific.

In further addition, the same DM-RS pattern may be assigned to different receivers 110 when Multi User Multiple-Input and Multiple-Output (MU-MIMO) is performed.

Action 703

The information entity is transmitted on the at least one antenna port associated with the assigned 702 DM-RS pattern, to be received by the receiver 110.

Figure 8:
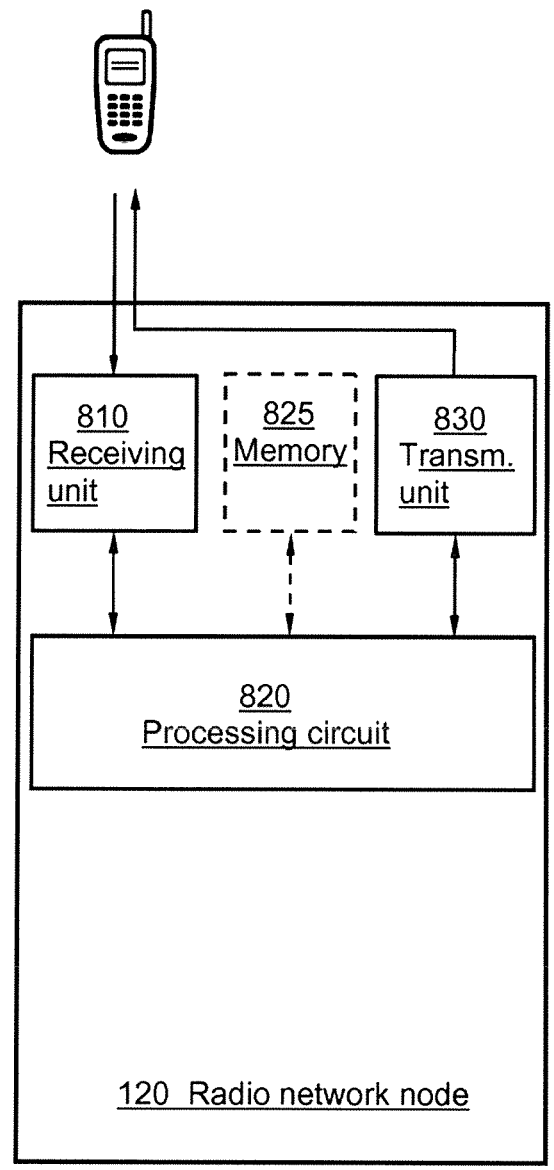
FIG. 8 is a block diagram illustrating a radio network node according to an embodiment of the invention.

FIG. 8 is a block diagram illustrating a radio network node 120 in a wireless communication system 100. The radio network node 120 is configured for transmitting an information entity, over at least one antenna port, in a subframe comprising a plurality of time-frequency resources. These time-frequency resources may also be referred to as Resource Elements (REs). The information entity, which may comprise data when transmitted in a data channel and control information when transmitted in a control channel, is to be received by a receiver 110 in the wireless communication system 100. Further, the radio network node 120 is also configured for enabling demodulation of the information entity by the receiver 110 by also transmitting a Demodulation Reference Signal (DM-RS) comprising a DM-RS pattern. The DM-RS pattern comprises a set of positions of said time-frequency resources, wherein the positions in the DM-RS pattern are associated with at least one antenna port for transmission of the information entity.

The wireless communication system 100 may be based on Long-Term Evolution (LTE) within the Third Generation Partnership Project (3GPP) according to some embodiments, wherein the radio network node 120 may comprise e.g. an Evolved Node B. The receiver 110 may comprise a User Equipment (UE), in some embodiments.

The radio network node 120 is configured to perform the different embodiments of the above described method 700 according to any, some or all of the actions 701-703 for transmitting an information entity.

For enhanced clarity, any internal electronics or other components of the radio network node 120, not completely indispensable for understanding the herein described embodiments has been omitted from FIG. 8.

The radio network node 120 comprises a processing circuit 820, configured for defining, for at least one subframe, a set of at least two distinct DM-RS patterns. The processing circuit 820 is also configured for assigning one DM-RS pattern, from the defined set of DM-RS patterns, to the receiver 110.

The processing circuit 820 may comprise e.g. one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as e.g. any, some or all of the ones enumerated above.

The processing circuit 820 may further perform data processing functions for inputting, outputting, and processing of data comprising data buffering and device control functions, such as call processing control, user interface control, or the like.

Further, the radio network node 120 comprises a transmitting unit 830, configured for transmitting the information entity on the at least one antenna port associated with the assigned DM-RS pattern.

In addition, according to some embodiments, the radio network node 120 may comprise a receiving unit 810, configured for receiving radio signals over a wireless interface. The radio signals may be received from e.g. the receiver 110, or any other entity configured for wireless communication according to some embodiments.

Furthermore, the radio network node 120 may comprise at least one memory 825, according to some embodiments. The memory 825 may comprise a physical device utilized to store data or programs i.e. sequences of instructions, on a temporary or permanent basis. According to some embodiments, the memory 825 may comprise integrated circuits comprising silicon-based transistors. Further, the memory 825 may be volatile or non-volatile.

The actions 701-703 to be performed in the radio network node 120 may be implemented through the one or more processing circuits 820 in the radio network node 120, together with computer program code for performing the functions of the actions 701-703. Thus a computer program product, comprising instructions for performing the actions 701-703 in the radio network node 120 may perform transmission of an information entity, over at least one antenna port, in a subframe comprising a plurality of time-frequency resources, to a receiver 110 in the wireless communication system 100, and enable demodulation of the information entity by the receiver 110 by also transmitting a Demodulation Reference Signal (DM-RS) comprising a DM-RS pattern to the receiver 110, when the instructions of the computer program code are loaded in the processing circuit 820.

The computer program product mentioned above may be provided for instance in the form of a data carrier carrying computer program code for performing at least some of the actions 701-703 according to some embodiments when being loaded into the processing circuit 820. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the radio network node 120 remotely, e.g. over an Internet or an intranet connection.

Figure 9:
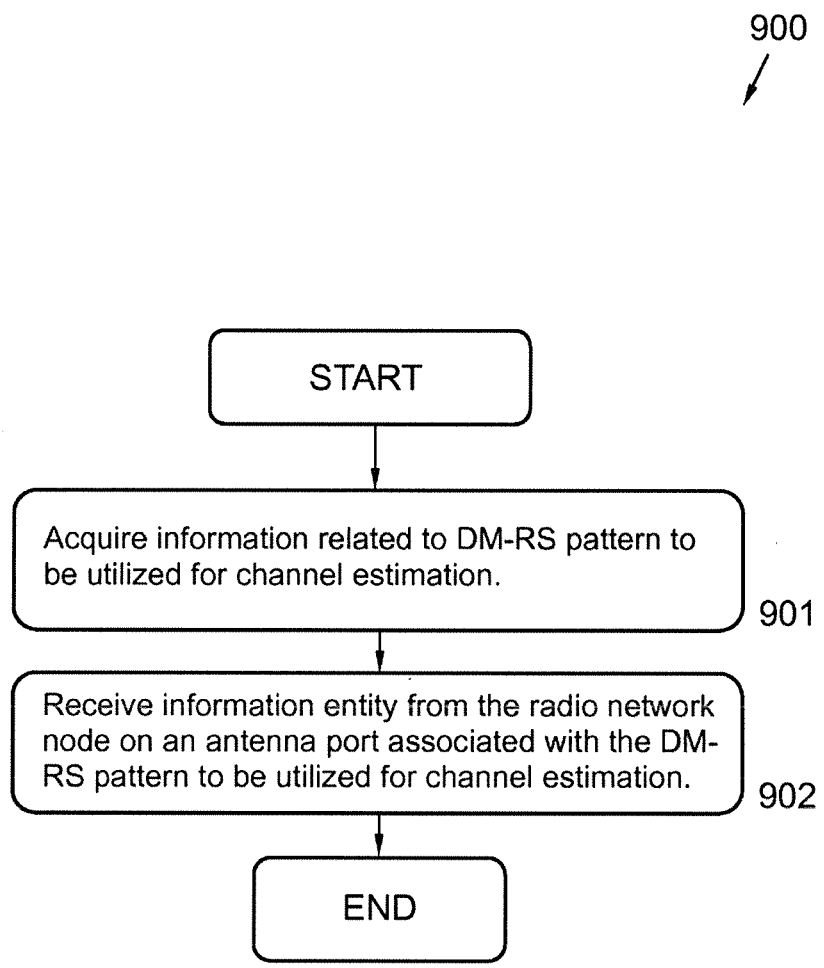
FIG. 9 is a flow chart illustrating a method in a receiver according to an embodiment of the invention.

FIG. 9 is a flow chart illustrating embodiments of a method 900 for use in a receiver 110 in a wireless communication system 100. The method 900 aims at receiving an information entity, over at least one antenna port, in a subframe comprising a plurality of time-frequency resources, which information entity is received from a radio network node 120 in a wireless communication system 100. Demodulation of the information entity is enabled by also receiving a Demodulation Reference Signal, DM-RS, comprising a DM-RS pattern comprising a set of positions of said time-frequency resources, wherein the positions in the DM-RS pattern are associated with at least one antenna port for reception of the information entity. The information entity may comprise data or control information in different embodiments.

Further, at least one channel, such as a data channel or a control channel may be associated with a set of at least two distinct DM-RS patterns.

According to some embodiments, the DM-RS pattern may be receiver-specific, such that, for the at least one subframe, different DM-RS patterns are acquirable for different receivers 110.

However, according to some embodiments, the DM-RS pattern may be cell-specific, such that, for the at least one subframe, the same DM-RS patterns are assignable to different receivers 110.

Further the DM-RS pattern may be cell-specific, based on carrier type determined by type of reference signals transmitted on that carrier.

The DM-RS pattern to be utilized for channel estimation may be based on a predefined rule according to some embodiments. In such embodiments, the predefined rule may relate to any of: capability of the receiver 110 in terms of multiple antenna reception; modulation; coding schemes; number of utilized antenna ports of the receiver 110; number of system release of the receiver 110; subframe type; a transmission parameter related to modulation; code rate; MIMO mode; whether time- or frequency bundling is applied; Radio Network Temporary Identifier, RNTI, and/or scheduled Resource Block, RB location.

Also, the predefined rule may relate to a predefined DM-RS pattern for a common search space of a downlink control channel, in some embodiments.

In some embodiments, the DM-RS pattern may be predefined for a physical broadcast channel.

The wireless communication system 100 may be based on Long-Term Evolution (LTE) within the Third Generation Partnership Project (3GPP) according to some embodiments, wherein the radio network node 120 may comprise e.g. an Evolved Node B. The receiver 110 may comprise a User Equipment (UE).

According to some embodiments, resource-block bundling over at least two subframes, may be applied in the time domain. In at least some such embodiments, the same DM-RS pattern may be used for at least two subframes that are bundled together in the time domain.

Further, in some embodiments wherein resource block bundling is applied, in frequency and/or time domain, the DM-RS pattern may comprise DM-RS symbols uniformly spaced in frequency and/or time domains respectively.

To appropriately perform the reception of the information entity, the method 900 may comprise a number of actions 901-902.

It is however to be noted that any, some or all of the described actions 901-902, may be performed in a somewhat different chronological order than the enumeration indicates, or even be performed simultaneously. The method 900 may comprise the following actions:

Action 901

Information related to a DM-RS pattern to be utilized for channel estimation is acquired.

In some embodiments, wherein the DM-RS pattern is predetermined, the acquisition of the DM-RS pattern comprises obtaining and applying the predetermined DM-RS pattern.

In some embodiments, information concerning the DM-RS pattern is signalled to the receiver 110 from the radio network node 120. According to some such embodiments, information concerning the DM-RS pattern for broadcast channel reception may be acquired, i.e. received, during the cell search procedure.

However, in some embodiments, transmission received from the radio network node 120 on a data channel, responding to previously made signalling, made by the receiver 110 over a random access channel and wherein the DM-RS pattern may be predefined for such transmissions on the data channel, related to responses to receiver-signalling over the random access channel.

Furthermore, in some embodiments, wherein a predefined DM-RS pattern is utilized for a downlink control channel and a set of DM-RS patterns is configured for the data channel, information may be acquired over the downlink control channel from the radio network node 120, indicating which DM-RS pattern that has been assigned to the receiver 110 to be used for the data channel.

In some embodiments, system information may be acquired on the data channel, to enable communication with the radio network node 120. In at least some such embodiments, the DM-RS pattern may be predefined for data channel transmissions related to system information.

However, information regarding the DM-RS patterns may be acquired according to some embodiments by receiving the information by signalling from the radio network node 120 by receiver-specific radio resource control signalling.

In addition, according to certain embodiments, the DM-RS pattern may be acquired over a broadcast channel by descrambling a Cyclic Redundancy Check (CRC) entity with a codeword, decoding information on the DM-RS pattern to be utilized.

Action 902

The information entity is received from the radio network node 120 on an antenna port associated with the DM-RS pattern to be utilized for channel estimation.

Figure 10:
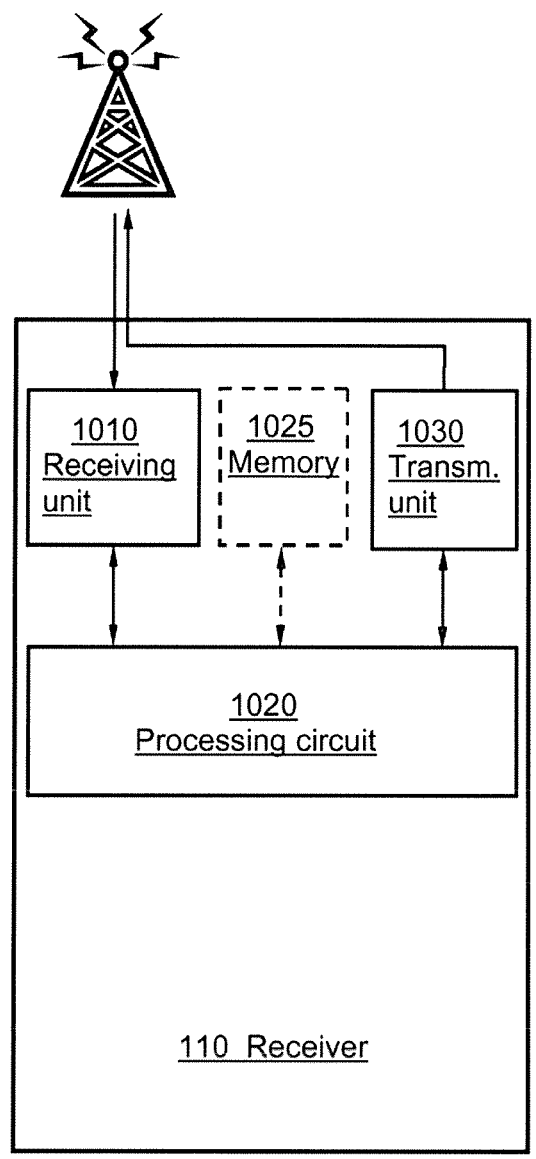
FIG. 10 is a block diagram illustrating a receiver according to an embodiment of the invention.

FIG. 10 is a block diagram illustrating a receiver 110 in a wireless communication system 100. The receiver 110 is configured for receiving an information entity, over at least one antenna port, in a subframe comprising a plurality of time-frequency resources, which information entity is received from a radio network node 120 in a wireless communication system 100. Demodulation of the information entity is enabled by also receiving a Demodulation Reference Signal, DM-RS, comprising a DM-RS pattern comprising a set of positions of said time-frequency resources, wherein the positions in the DM-RS pattern are associated with at least one antenna port for reception of the information entity. The information entity may comprise data or control information in different embodiments.

The wireless communication system 100 may be based on Long-Term Evolution (LTE) within the Third Generation Partnership Project (3GPP) according to some embodiments, wherein the radio network node 120 may comprise e.g. an Evolved Node B. The receiver 110 may comprise a User Equipment (UE), in some embodiments.

The receiver 110 is configured to perform any, some or all of the actions 901-902 for receiving an information entity.

For enhanced clarity, any internal electronics or other components of the receiver 110, not completely indispensable for understanding the herein described embodiments has been omitted from FIG. 10.

The receiver 110 comprises a processing circuit 1020, configured for acquiring information related to a DM-RS pattern to be utilized for channel estimation, according to any embodiment of the previously described method 900.

The processing circuit 1020 may comprise e.g. one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as e.g. any, some or all of the ones enumerated above.

The processing circuit 1020 may further perform data processing functions for inputting, outputting, and processing of data comprising data buffering and device control functions, such as call processing control, user interface control, or the like.

Further the receiver 110 comprises a receiving unit 1010, configured for receiving the information entity from the radio network node 120 on an antenna port associated with the acquired DM-RS pattern.

Also, according to some embodiments, the receiver 110 may comprise a transmitting unit 1030, configured for transmitting radio signals.

Furthermore, the receiver 110 may comprise at least one memory 1025, according to some embodiments. The memory 1025 may comprise a physical device utilized to store data or programs i.e. sequences of instructions, on a temporary or permanent basis. According to some embodiments, the memory 1025 may comprise integrated circuits comprising silicon-based transistors. Further, the memory 1025 may be volatile or non-volatile.

The actions 901-902 to be performed in the receiver 110 may be implemented through one or more processing circuits 1020 in the receiver 110, together with computer program code for performing the functions of the actions 901-902. Thus a computer program product, comprising instructions for performing the actions 901-902 in the receiver 110 may perform reception of an information entity, over at least one antenna port, in a subframe comprising a plurality of time-frequency resources, from a radio network node 120 in the wireless communication system 100, and enable demodulation of the information entity by the receiver 110 by also receiving a Demodulation Reference Signal (DM-RS) comprising a DM-RS pattern from the radio network node 120, when the instructions of the computer program code are loaded in the processing circuit 1020.

The computer program product mentioned above may be provided for instance in the form of a data carrier carrying computer program code for performing at least some of the actions 901-902 according to some embodiments when being loaded into the processing circuit 1020. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the receiver 110 remotely, e.g. over an Internet or an intranet connection.

Further it may be noted, by means of example and in order to simplify the comprehension, the term SINR has been consistently used in this text when describing a Signal to Interference and Noise Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to Noise Ratio (SNR or S/N), Signal to Noise and Interference Ratio (SNIR), Signal to noise and Interference Ratio (SIR) or an inversion of the ratio, like Interference to Signal Ratio, (ISR). Any of these or similar ratios may be utilized in the context of this disclosure instead of SINR.

The terminology used in the detailed description of the invention as illustrated in the accompanying drawings is not intended to be limiting of the described methods 700, 900, radio network node 120 and receiver 110, which instead are limited by the enclosed claims.

As used herein, the term "and/or" comprises any and all combinations of one or more of the associated listed items. In addition, the singular forms "a", "an" and "the" are to be interpreted as "at least one", thus also comprising a plurality, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

What is claimed is:

1. A method in a radio network node for transmission of an information entity, over at least one antenna port, in a subframe comprising a plurality of time-frequency resources, in which the information entity is to be received by a receiver in a wireless communication system, wherein demodulation of the information entity by the receiver is enabled by also transmitting a Demodulation Reference Signal (DM-RS) comprising a DM-RS pattern comprising a set of positions of the plurality of time-frequency resources, wherein the positions in the DM-RS pattern are associated with at least one antenna port for transmission of the information entity, the method comprising:
    defining, for at least one subframe, a set of at least two distinct DM-RS patterns, the set of at least two distinct DM-RS patterns defined for at least one subframe comprises a first DM-RS pattern with a first reference signal density and a second DM-RS pattern with a second reference signal density, wherein the second reference signal density is higher than the first reference signal density, wherein the second DM-RS pattern is created by adding time-frequency resources, for DM-RS symbols to the first DM-RS pattern;
    redefining antenna port mapping for the first DM-RS pattern, wherein redefining the antenna port mapping for the first DM-RS pattern further comprises assigning of the time-frequency resources of the second DM-RS to a smaller set of antenna ports of the first DM-RS pattern;
    assigning one DM-RS pattern, from the defined set of DM-RS patterns, to the receiver; and
    transmitting the information entity on the at least one antenna port associated with the assigned DM-RS pattern.

2. The method according to claim 1, wherein the assigned DM-RS pattern is receiver-specific, such that, for the at least one subframe, different DM-RS patterns are assignable to different receivers.

3. The method according to claim 1, wherein the assigned DM-RS pattern is cell-specific, such that, for the at least one subframe, the same DM-RS patterns are assignable to different receivers.

4. The method according to claim 3, wherein the assigned DM-RS pattern is cell-specific and determined by type of reference signals transmitted on a carrier.

5. The method according to claim 1, wherein different sets of DM-RS patterns are defined on different cells served by the radio network node, for a receiver in a multi carrier scenario such that a union of different sets of the different carriers comprises at least two distinct DM-RS patterns.

6. The method according to claim 1, wherein the DM-RS pattern is assigned to the receiver based on a predefined rule.

7. The method according to claim 1, wherein:
    the wireless communication system is a Long Term Evolution (LTE) system;
    the receiver is a User Equipment (UE); and
    the radio network node is an evolved NodeB (eNodeB).

8. A radio network node, for transmission of an information entity, over at least one antenna port, in a subframe comprising a plurality of time-frequency resources, in which the information entity is to be received by a receiver in a wireless communication system, wherein demodulation of the information entity by the receiver is enabled by also transmitting a Demodulation Reference Signal (DM-RS), comprising a DM-RS pattern comprising a set of positions of said time-frequency resources assigned to the receiver, wherein the positions in the DM-RS pattern are associated with at least one antenna port for transmission of the information entity, wherein the radio network node comprises:
    a processing circuit, configured for:
        defining, for at least one subframe, a set of at least two distinct DM-RS patterns, the set of at least two distinct DM-RS patterns defined for at least one subframe comprises a first DM-RS pattern with a first reference signal density and a second DM-RS pattern with a second reference signal density, wherein the second reference signal density is higher than the first reference signal density, wherein the second DM-RS pattern is created by adding time-frequency resources, for DM-RS symbols to the first DM-RS pattern,
        redefining antenna port mapping for the first DM-RS pattern, wherein redefining the antenna port mapping for the first DM-RS pattern further comprises assigning of the time-frequency resources of the second DM-RS to a smaller set of antenna ports of the first DM-RS pattern, and
        assigning one DM-RS pattern, from the defined set of DM-RS patterns, to the receiver; and
    a transmitting unit, configured for transmitting the information entity on the at least one antenna port associated with the assigned DM-RS pattern.

* * * * *